(12) United States Patent
Anderson et al.

(10) Patent No.: US 7,821,709 B2
(45) Date of Patent: Oct. 26, 2010

(54) SYSTEM AND METHOD FOR VIEWING PROJECTED LIGHT FROM PORTABLE DEVICES

(75) Inventors: Jon Anderson, Brielle, NJ (US); Richard Zoccolillo, Wall, NJ (US)

(73) Assignee: Opnext, Inc., Eatontown, NJ (US)

( * ) Notice: Subject to any disclaimer, the term of this patent is extended or adjusted under 35 U.S.C. 154(b) by 194 days.

(21) Appl. No.: 11/870,474

(22) Filed: Oct. 11, 2007

(65) Prior Publication Data
US 2009/0097111 A1    Apr. 16, 2009

(51) Int. Cl.
*G03B 21/56* (2006.01)
(52) U.S. Cl. ............................ 359/443; 359/461; 353/79
(58) Field of Classification Search ................. 359/449, 359/461, 443; 353/79
See application file for complete search history.

(56) References Cited

U.S. PATENT DOCUMENTS

| | | | | |
|---|---|---|---|---|
| 3,756,710 A | * | 9/1973 | Taylor | 353/43 |
| 4,059,351 A | * | 11/1977 | Wisotsky | 40/362 |
| 5,160,951 A | * | 11/1992 | Lander | 353/79 |
| 5,706,130 A | * | 1/1998 | Rosen | 359/443 |
| 6,052,227 A | * | 4/2000 | Niwa et al. | 359/461 |
| 6,312,129 B1 | * | 11/2001 | Sisodia et al. | 353/31 |
| 6,529,323 B2 | * | 3/2003 | Okumura | 359/461 |
| 6,642,918 B2 | * | 11/2003 | Uchida et al. | 345/156 |
| 6,806,850 B2 | * | 10/2004 | Chen | 345/7 |
| 7,434,938 B2 | * | 10/2008 | Schneider et al. | 353/77 |
| 7,623,290 B2 | * | 11/2009 | Liang et al. | 359/443 |
| 2008/0204870 A1 | * | 8/2008 | Choi | 359/461 |

* cited by examiner

*Primary Examiner*—Christopher Mahoney
(74) *Attorney, Agent, or Firm*—Kaplan Gilman & Pergament LLP

(57) ABSTRACT

An apparatus is disclosed which may include a sheet of reflective material suitable for forming a display screen; a screen control mechanism operable to move the reflective material into extended and retracted positions, wherein the apparatus is portable and configured to receive image data from a handheld projection device.

19 Claims, 10 Drawing Sheets

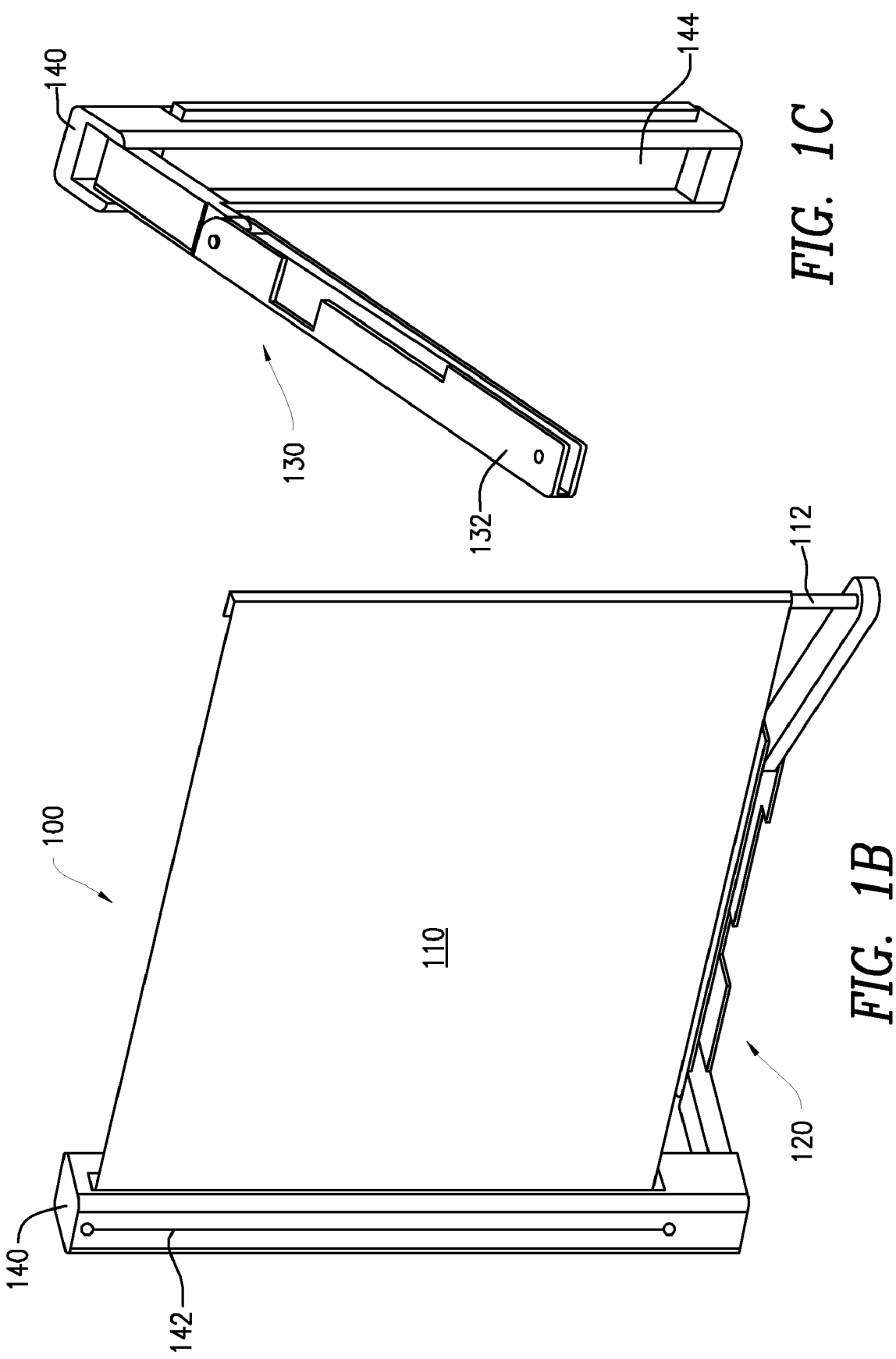

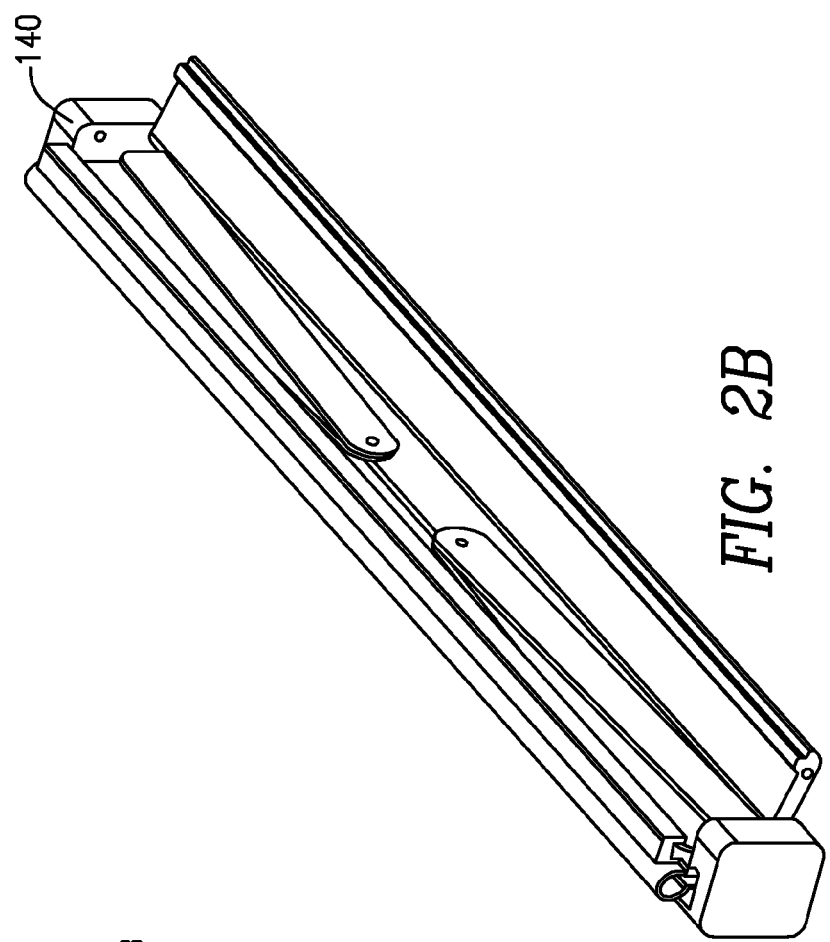
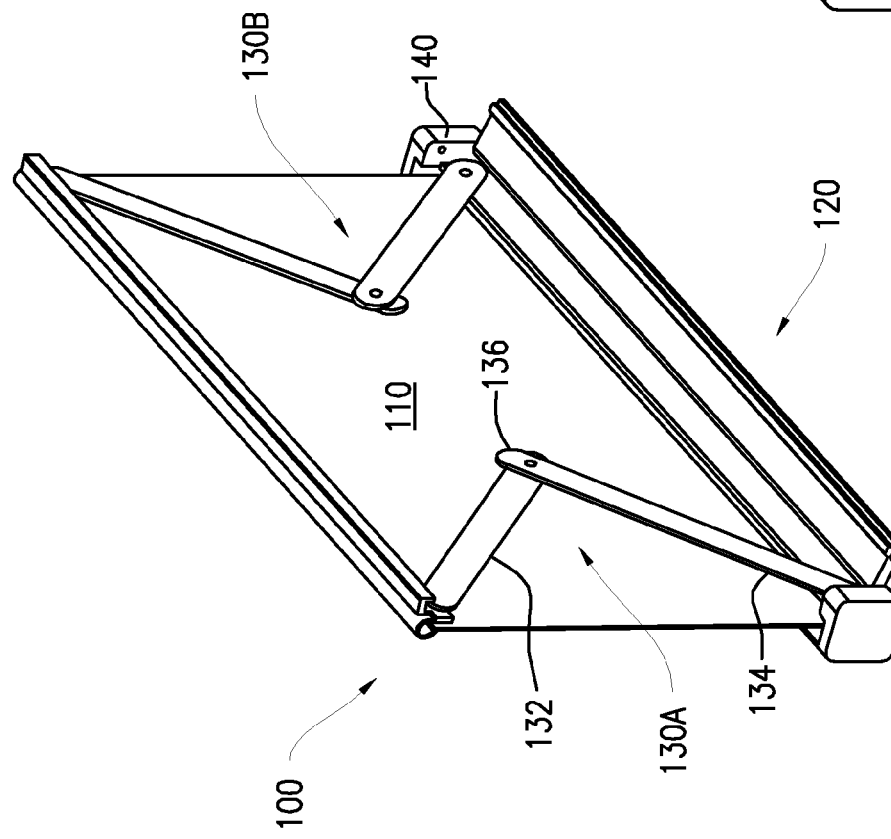
FIG. 2B
FIG. 2A

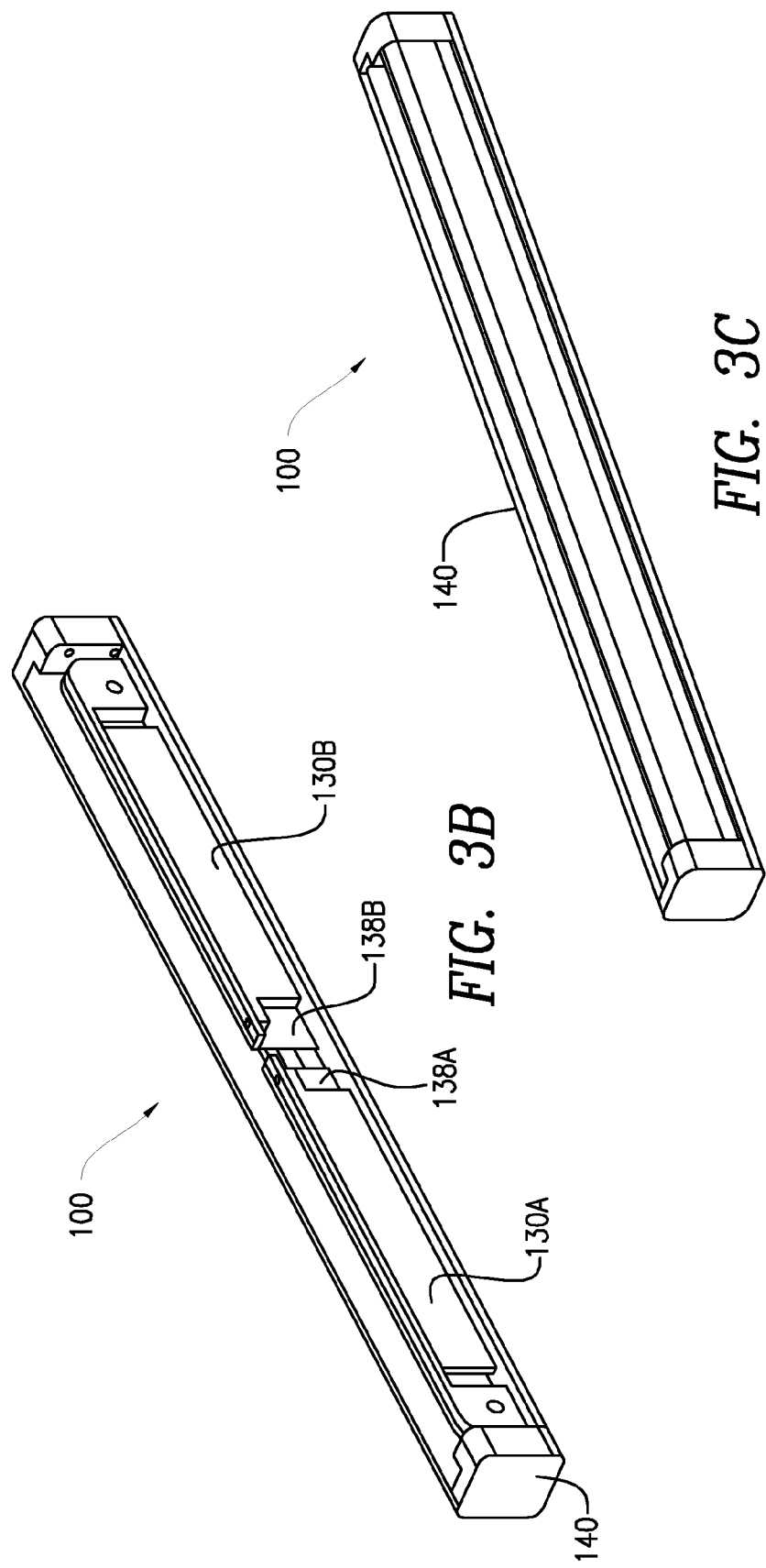

SYSTEM AND METHOD FOR VIEWING PROJECTED LIGHT FROM PORTABLE DEVICES

BACKGROUND OF THE INVENTION

Traditional home projection systems are typically used in conjunction with reflective screens measuring several feet on a side. Such screens are commonly permanently stored in a private home due to their dimensions and weight. LED-based optical technologies are now emerging that enable miniaturization of free-space light projectors for image and video display. Such projectors are envisioned to be of a size that enables integration into hand-held media devices such as cellular phones, PDAs (Personal Digital Assistants), video iPODs, or other devices that are also configured to use free-space light projection in a similar environment.

Traditional projection screens are not compatible with the above-mentioned projection devices. Moreover, surfaces available for receiving light from the miniature devices may be inconveniently oriented with respect to a user, may have undesirable optical characteristics, and would likely preclude the possibility of providing any privacy for viewing personalized content.

Accordingly, there is a need in the art for an improved system and method for viewing images provided by small, portable projection devices.

SUMMARY OF THE INVENTION

In accordance with one aspect, the invention is directed to an apparatus, that may include a sheet of reflective material suitable for forming a display screen; and a screen control mechanism operable to move the reflective material into extended and retracted positions, wherein the apparatus is portable and configured to receive image data from a hand-held projection device.

In accordance with another aspect, the invention is directed to an apparatus that may include a projector disposed on a first portion of a housing; a screen disposed on a second portion of the housing, wherein the first and second portions of the housing are movable with respect to one another; and a screen adjustment mechanism enabling the second portion of the housing to be adjusted so as to position the screen to receive free space light projection from the projector.

Other aspects, features, advantages, etc. will become apparent to one skilled in the art when the description of the preferred embodiments of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

FIG. 1B is a perspective view of the display apparatus of FIG. 1A showing the front of display screen;

FIG. 1C is a perspective view of the display apparatus of FIG. 1A prominently illustrating the screen control mechanism of the display apparatus;

FIG. 2A is a perspective view of a display apparatus in accordance with another embodiment of the present invention;

FIG. 2B is a perspective view of the display apparatus of FIG. 2A in which the display screen and screen control mechanism are mostly retracted into the enclosure of the projection apparatus;

FIG. 3B is a close-up view of the screen control mechanism, of the projection apparatus of FIG. 3A, in a retracted position;

FIG. 3C is a perspective view of the display apparatus of FIG. 3A in which the apparatus has been retracted into its enclosure;

DETAILED DESCRIPTION OF THE PREFERRED EMBODIMENTS

Figure 1A:
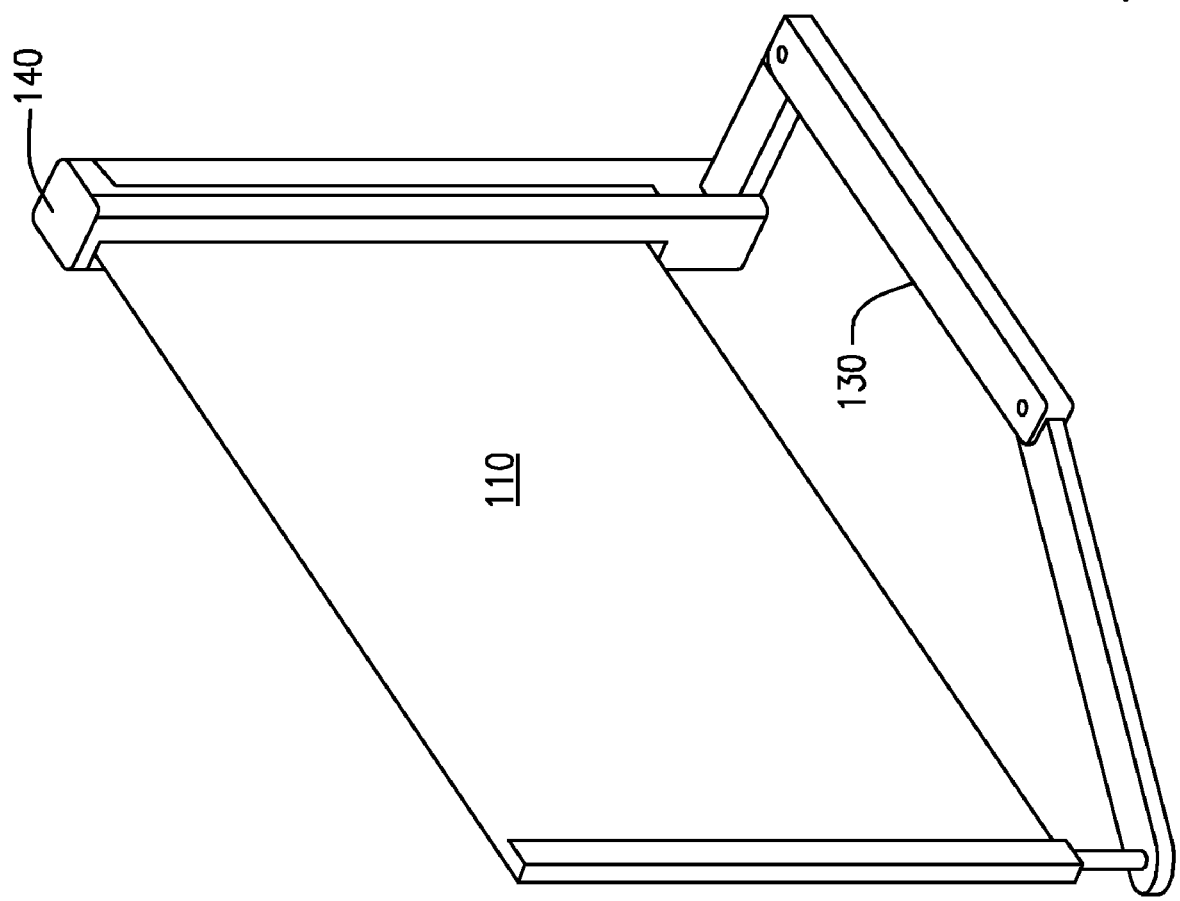
FIG. 1A is a perspective view of a display apparatus in accordance with an embodiment of the present invention.

FIG. 1A is a perspective view of a display apparatus 100 in accordance with an embodiment of the present invention. Light projectors, that are small to miniature in size, would benefit from the availability of a conveniently accessible, flexible, reflective surface onto which free-space projected light image could be displayed. The embodiments discussed herein present various projection screen options for use with small light projectors.

Display apparatus 100 may include reflective screen material 110, screen control mechanism 130, and/or enclosure 140. Reflective material 110 may be coupled to post 112. FIG. 1A shows the rear portion of screen material 110; and FIG. 1B shows the front, reflective side of material 110. The bottom portion of display apparatus 100 may include stand 120. The bottom surfaces of enclosure 140 and screen control mechanism 130 may combine to form a stand 120 that enables display apparatus 100 to be free standing and to be positioned independently of a projector (not shown) directing light toward screen 110. Thus, using this approach, stand 120 is integral to display apparatus 100. Alternatively, stand 120 may be a separate part that is coupled to the bottom ends of enclosure 140 and screen control mechanism 130.

Reflective material 110 (which may also be referred to herein as screen material 110) may include flexible, reflective material suitable for forming a display screen. Any suitable material may be employed, such as, but not limited to plain vinyl, or glass-beaded vinyl. Reflective material 110 is preferably capable of forming a flat planar surface when in use as a display screen and is preferably also capable of being reduced in size for the sake of storage, when not in use.

In one embodiment, material 110 may be wrapped around spindle 142 that may be housed within enclosure 140. Spindle 142 may be spring-loaded to enable material 110 to automatically wind around spindle 142 when not restrained by an external force. Alternatively, a manual spindle control could be provided to enable material 110 to be manually rolled around spindle 142, when material 110 is not in use as a display screen.

Screen material 110, when fully unrolled, may be about seven inches long and about five inches wide. However, the invention is not limited to the use of screen material 110 having these dimensions. Material 110 may have a length less than or greater than seven inches and may have a width that is less than or greater than five inches.

Display apparatus 100 may further include enclosure 140. Enclosure 140 may include a spindle 142 around which screen material 110 may be wrapped for storage, when display apparatus 100 is not in use. Enclosure 140 is preferably sized so as to be able to completely enclose screen material 110, when this material is fully rolled up around spindle 142.

Display apparatus 100 may further include screen control mechanism 130. Screen control mechanism is preferably employed to control the condition and position of screen material 110. Screen control mechanism 130 may be employed to fully expand, or extend, screen material 110 in preparation for using screen material 110 to reflect light in a projection operation. During projection, screen control mechanism is preferably operable to secure screen material 110 in a fixed position and orientation with respect to a source of light projection to ensure uninterrupted viewing. Thus, screen control mechanism 130 may include one or more locking mechanisms.

Screen control mechanism 130 may also be used to retract screen material 110 from an extended position thereof to store screen material 110 within enclosure 140. More specifically, in the embodiment of FIG. 1, screen control mechanism may retract screen material 110 toward spindle 142 within enclosure 140. In this manner, screen material 110 may be stored within a compact footprint within enclosure 140.

Screen control mechanism 130 (also, "control mechanism 130") may be implemented using a range of different devices, a selection of which are discussed herein. Such devices may include but are not limited to: a least one cantilevered beam or arm, a one or more connected series of articulating metal links (such as a grille linkage), and/or a ratchet and detent mechanism.

In this section, the structure of the control mechanism 130 of FIG. 1 is discussed, followed by a description of its method for extending and subsequently retracting screen material 110. Control mechanism 130 may be in the form of a cantilevered arm 132 including linkage that may form a secure link with post 112 of screen material 110 and that may operate to manipulate the position of screen material 110 as needed. One example of such an articulated cantilevered arm is shown, in a fully extended condition, in FIG. 1C.

In this embodiment, the outer end of the arm 132 of control mechanism 130 may be articulated and positioned so as to engage post 112 (FIG. 1B) when the screen material coupled to post 112 is in the retracted position (as shown in FIG. 1C). After engaging post 112, arm 132 may be articulated so as to pull screen material 110 out of enclosure 140 to ultimately reach an extended position for screen material 110, as shown in FIG. 1B. Upon having been articulated so as to place screen material 110 in an extended position suitable for viewing projected light, control mechanism 130 may be locked into position using a suitable mechanism. Such a locking mechanism may include but is not limited to one or more clamps, one or more clips, a detent mechanism, a threaded brake mechanism, and/or other suitable device.

When viewing of projected images has concluded, control mechanism 130 is preferably unlocked and moved so as to cause screen material 110 to retract and be rolled around the spindle 142 in enclosure 140. Thereafter, if desired, cantilevered arm 132 may be moved into a recess 144 on the exterior of enclosure 140 that is configured to receive arm 132. When in a fully retracted condition within enclosure 140, display apparatus 100 may have dimensions of about 0.65 inches× 0.65 inches×6 inches. However, display apparatus 100 in its retracted condition may have respective dimensions smaller than or larger than those listed above.

FIG. 2A is a perspective view of a display apparatus 100 in accordance with another embodiment of the present invention. Display apparatus 100 may include enclosure 140, screen material 110, and screen control mechanism 130. Display apparatus 100 may include stand 120, which may be an integral part of enclosure 140, or which may, alternatively, be a separate part attachable to enclosure 140.

Figure 2D:
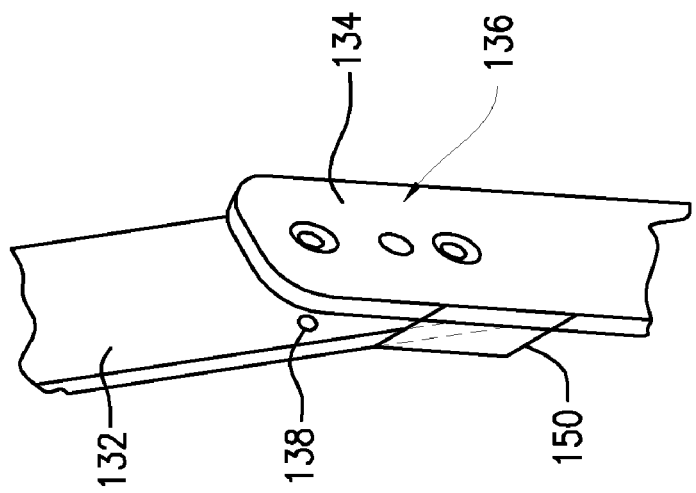
FIG. 2D is a perspective view of a junction between two links that form part of the screen control mechanism in accordance with an embodiment of the present invention.
Figure 2C:
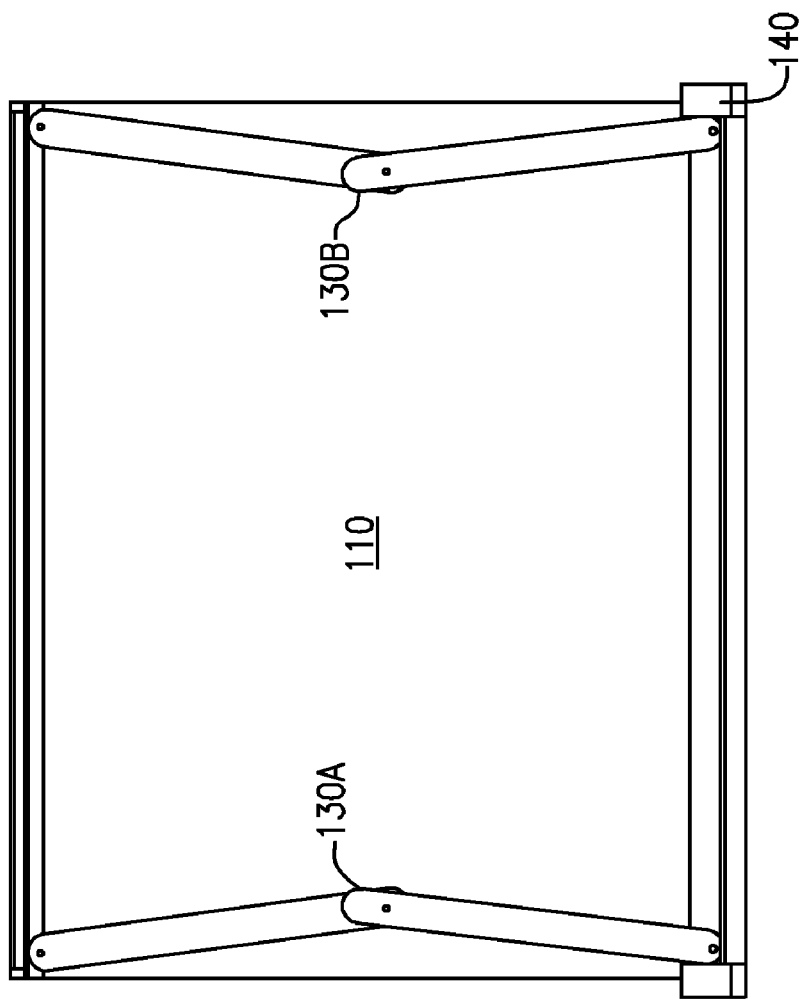
FIG. 2C is a perspective view of the display apparatus of FIG. 2A in which the screen is fully extended.

FIG. 2A shows screen display apparatus 100 with screen control mechanism 130 in a substantially extended position. FIG. 2B shows the apparatus of FIG. 2A in a retracted position within enclosure 140. FIG. 2C shows the display apparatus of FIG. 1A in a fully extended position. FIG. 2D is a blown-up view of the junction between two links in one of the linkage assemblies of screen control mechanism 130.

The display apparatus of FIG. 2 is similar to that of FIG. 1, except that the screen control mechanism 130 of FIG. 2 differs in construction and operation from that of FIG. 1. The enclosure 140 and screen material 120 of the embodiment of FIG. 2 may be substantially the same as those of the embodiment of FIG. 1. Accordingly, the following discussion is directed primarily to the screen control mechanism 130 of FIG. 2.

Screen control mechanism 130 may include linkage assemblies 130A and 130B. Linkage assembly 130A may in turn include link 132, link 134 and junction 136. Linkage assembly 130B may include the same component parts as linkage assembly 130A. However, for the sake of simplicity, the following discussion is directed to linkage assembly 130A.

Linkage assembly 130A may include link 132, link 134, and a junction 136. Junction 136 may include a detent mechanism to lock links 132 and 134 with respect to one another when screen control mechanism 130 reaches a point of maximum extension. Moreover, flanges, such as flange 150, may be disposed on one or both of links 132 and 134 to establish a limit on the motion of screen control mechanism 130.

When in the retracted position, links 132 and 134 may be nearly parallel to one another (see FIG. 2B). As screen control mechanism 130 is extended to expand the viewable area of screen material 110, links 132 and 134 rotate with respect to one another as is visible by comparing FIG. 2A with FIG. 2B. When screen control mechanism 130 reaches a point of maximum extension, as shown in FIG. 2C, a detent mechanism (not shown) in junction 136 may be operable to lock links 132 and 134 with respect to one another to prevent undesired retraction of screen control mechanism 130 and of screen material 110.

Junction 136 between links 132 and 134 is shown in greater detail in FIG. 2D. Various features may be provided to enhance the operation of junction 136. First, as mentioned above, a detent mechanism may be provided to lock the relative position of links 132 and 134 once the maximum extension of screen control mechanism 130, or other desired level of extension, is reached. This detent is preferably able to be readily manually unlocked when needed, so that screen material 110 and screen control mechanism 130 can be retracted.

With reference to FIG. 2D, bumps such as bump 138 may be provided on the surfaces of each of links 132 and 134 (on the surfaces of each link that face the other link, referred to herein as interfacing surfaces of the links) near the junction 136 to force the planar surfaces of portions of the respective links away from one another. This feature may beneficially prevent undesired contact between the two interfacing surfaces of links 132 and 134.

Again with reference to FIG. 2D, flanges, such as flange 150, may be disposed along a portion of the longitudinal edge of link 134 to limit the rotational movement of link 132 with respect to link 134, and thereby operate as a stop on the outward (extension-direction) advancement of screen control mechanism 130.

Figure 3A:
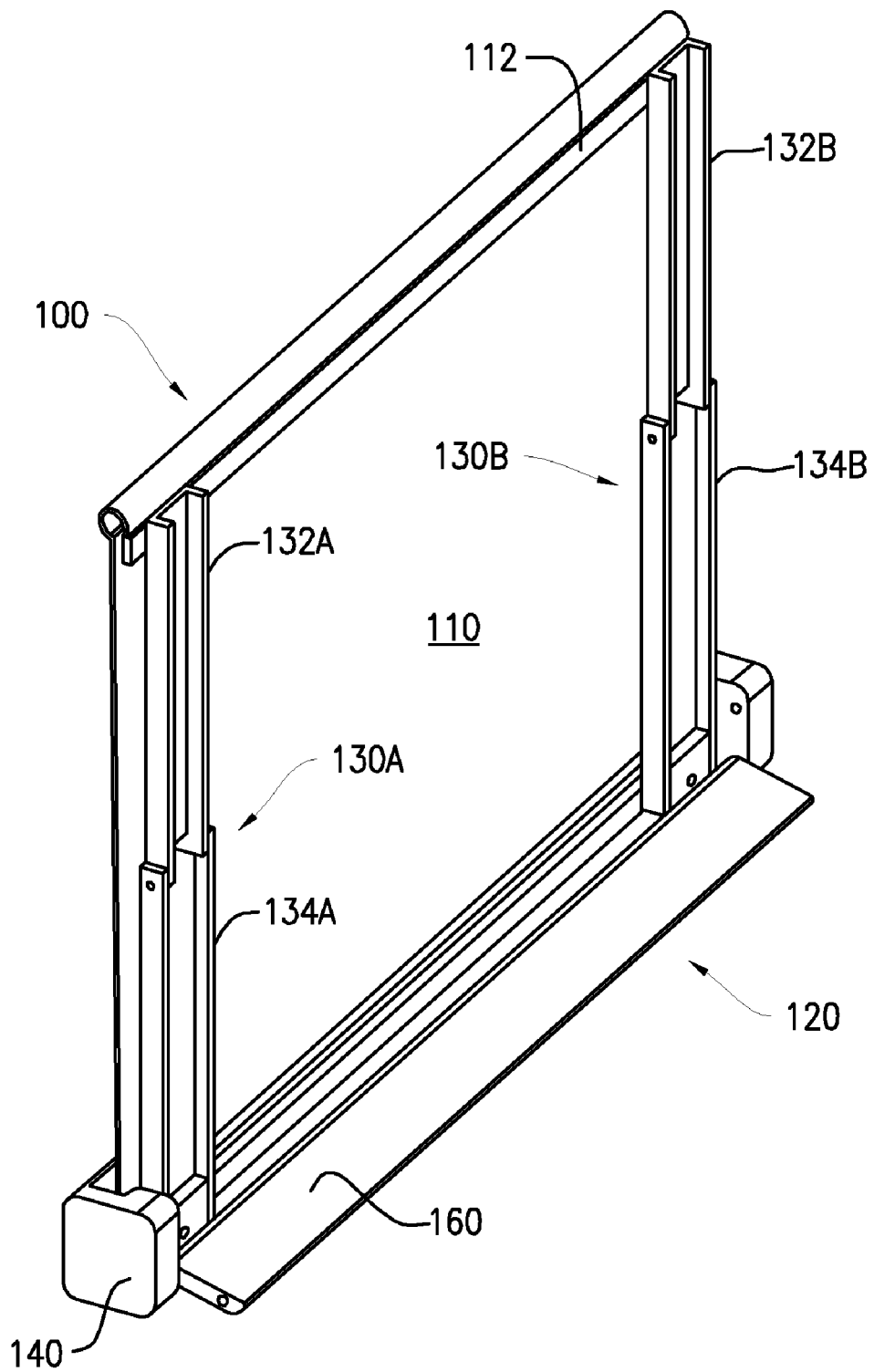
FIG. 3A is a perspective view of a display apparatus in accordance with an embodiment of the present invention.

FIG. 3A is a perspective view of a display apparatus 100 in accordance with an embodiment of the present invention. Display apparatus 100 of FIG. 3 presents yet another embodiment of a display apparatus suitable for projecting images from a portable projection device.

Display apparatus 100 may include screen material 110, stand 120, screen control mechanism 130, enclosure 140, stand 120, and/or enclosure cover 160. Screen control mechanism 130 may include folding arms 130A and 130B. In turn, folding arm 130A may include arm links 132A and 134A, and folding arm 132B may include arm links 132B and 134B.

FIG. 3B is a perspective view of the display apparatus 100 of FIG. 3A with the folding arms 130A, 130B retracted within the enclosure 140. FIG. 3C is a perspective view of the display apparatus 100 with the screen control mechanism 130 retracted within enclosure 140 and the enclosure cover 160 closed.

Attention is directed to screen control mechanism 130 which is the component of display apparatus 100 of FIG. 3 that differs from the previously described embodiments. In this embodiment, screen control mechanism 130 includes folding arms 130A and 130B. In FIG. 3A, arms 130A and 130B are shown coupled to screen material 110 and fully extended to enable display apparatus 100 to reflect projected light. As with previously discussed embodiments, arms 130A and 130B may be retracted and lodged within enclosure 140 to form a small and highly portable package when display apparatus 100 is not in use.

Starting in the extended position shown in FIG. 3A, arms 130A and 130B may first be disconnected from screen material 110. Thereafter, arms 130A and 130B may be folded around their respective axes. After this folding operation, arms 130A and 130B may be rotated into respective rest positions within enclosure 140. Preferably, upon reaching a final retracted position, folded arms 130A and 130B lie parallel to one another and to the longitudinal axis of enclosure 140, as shown in FIG. 3B. Thereafter, the screen material 110 may be retracted into enclosure 140, and enclosure cover 160 may be closed, thereby providing a fully retracted display apparatus 100 in the compact and portable condition shown in FIG. 3C. A spindle (not shown), optionally with spring loading, may be provided within enclosure 140 to aid in retracting and storing screen material 110, when display apparatus 110 is not in use. Attention is now directed to the reverse operation, that of extending screen material 110.

Bringing display apparatus 100 from the fully enclosed condition of FIG. 3C to the extended condition of FIG. 3A may include opening enclosure cover 160, rotating folded arms 130A and 130B out of enclosure 140, and unfolding arms 130A and 130B to their respective fully extended positions (FIG. 3A). Thereafter, screen material 110 may be moved from a retracted position within enclosure 140 and then moved such that screen post 112 is securely lodged within notches 138A and 138B (FIG. 3B) of arms 130A and 130B, respectively. A spindle (not shown), optionally with spring loading, may be provided within enclosure 140 to aid in retracting and storing screen material 110, when display apparatus 110 is not in use.

FIG. 4A-4F are perspective views of a projection kit 400 sealed within its enclosure 420, in accordance with an embodiment of the present invention. Projection kit 400 may include projector 500, screen 410, enclosure 420, panels 430, 440, and/or screen control mechanism 450. Screen control mechanism 450 may include spring and latch assembly 452. Projector 500 may include aperture 510.

Projection kit 400 provides all hardware needed to project and display (reflect) image data within a compact footprint using a portable and convenient package. When not in use for projecting light images, projection kit 400 may be configured so as to completely enclose any sensitive projection and display apparatus within a sturdy enclosure 420. Reconfiguring projection kit 400 for projection purposes may be accomplished by easily and rapidly manipulating a few moving parts within kit 400.

Enclosure 420 may be made of any material suitable for providing protection against impact and against intrusion of destructive elements into its interior, when closed. Enclosure 420 may be made of materials including but not limited to metal, plastic, and/or fiberglass. Enclosure 420 is preferably capable of being effectively sealed when closed, as shown in FIG. 4A.

Screen 410 may be a substantially rigid reflective sheet. Alternatively screen 410 may be composed of flexible sheet material. Screen 410 may be affixed to a rigid backing within enclosure 420. Panels 430 and 440 may be made of the same material as enclosure 420, or of any suitable alternative material.

Projector 500 may be a conventional free-space light projection device that directs project light out of aperture 510. Projector 500 is preferably sufficiently compact to enable projection kit 400 to be readily portable. In one embodiment, enclosure 420 has a length of about seven inches, a width of about five inches, and a height of about two inches. However, enclosure 420 may have a length less than or greater than seven inches, a width less than or greater than five inches, and a height less than or greater than two inches. Projector 500 preferably has a length of about six inches or less, a width of about four inches or less, and a height of about one inch or less. However, in alternative embodiments, projector 500 may have length, width, and/or height dimensions that are greater than or less than the above-listed ranges for these respective quantities.

Figure 4A:
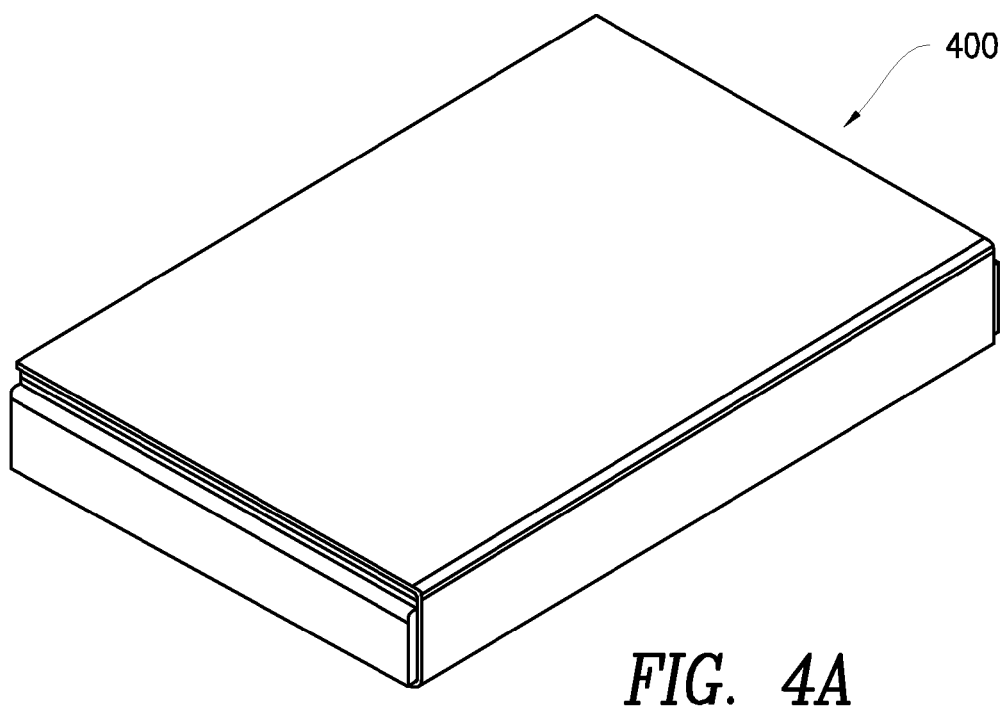
FIG. 4A is a perspective view of a projection kit sealed within its enclosure, in accordance with an embodiment of the present invention.
Figure 4B:
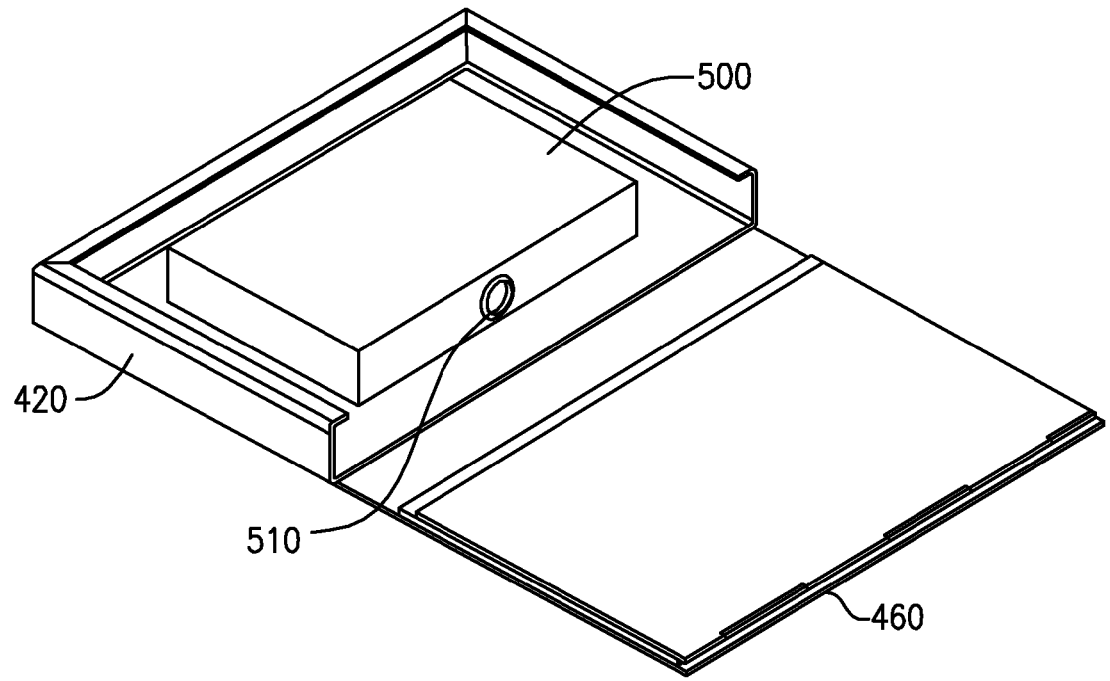
FIG. 4B is a perspective view of the projection kit of FIG. 4A showing a projector disposed within an open enclosure.
Figure 4C:
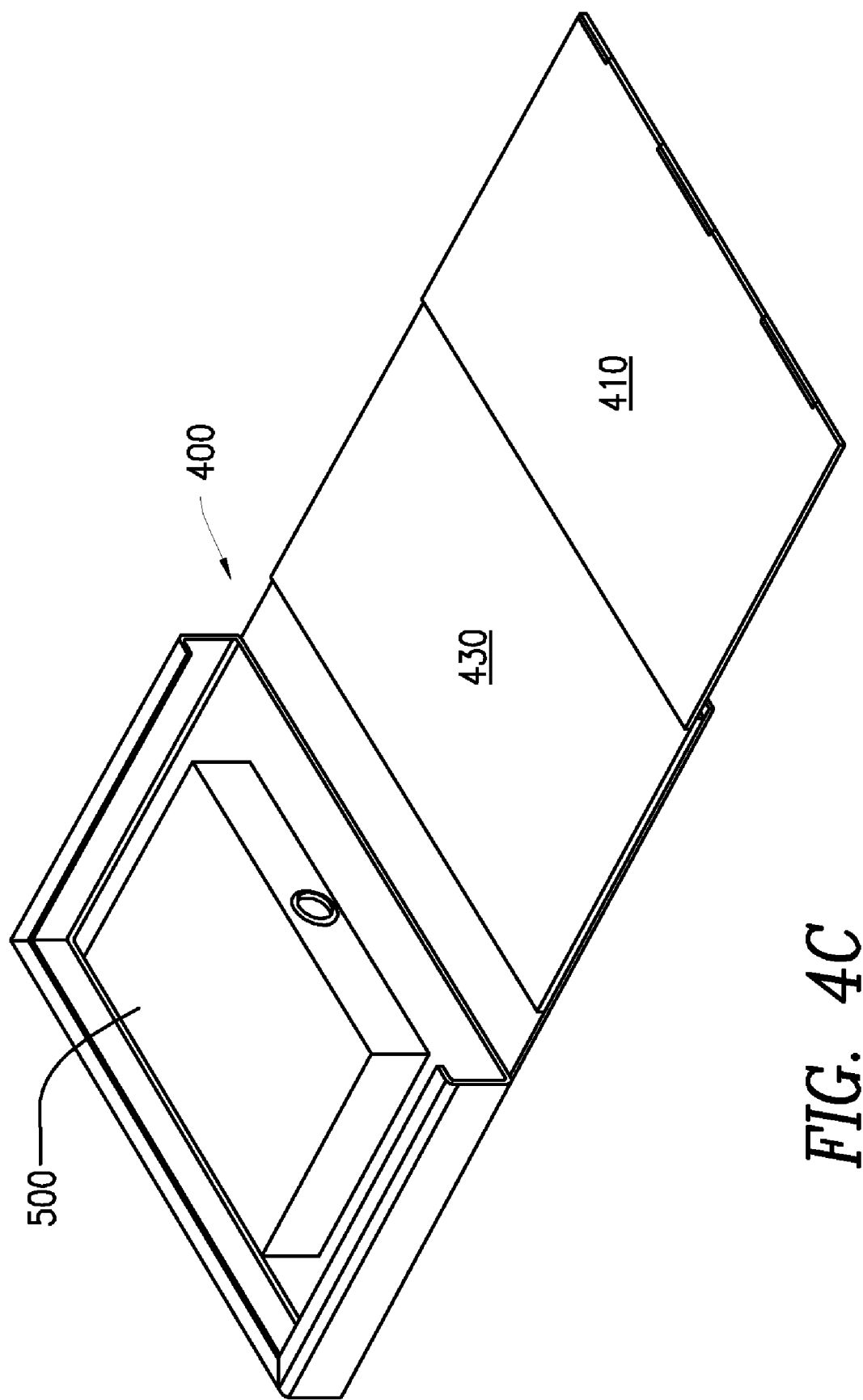
FIG. 4C is a perspective view of the projection kit of FIG. 4B in which the enclosure has been unfolded to reveal a plurality of panels.
Figure 4D:
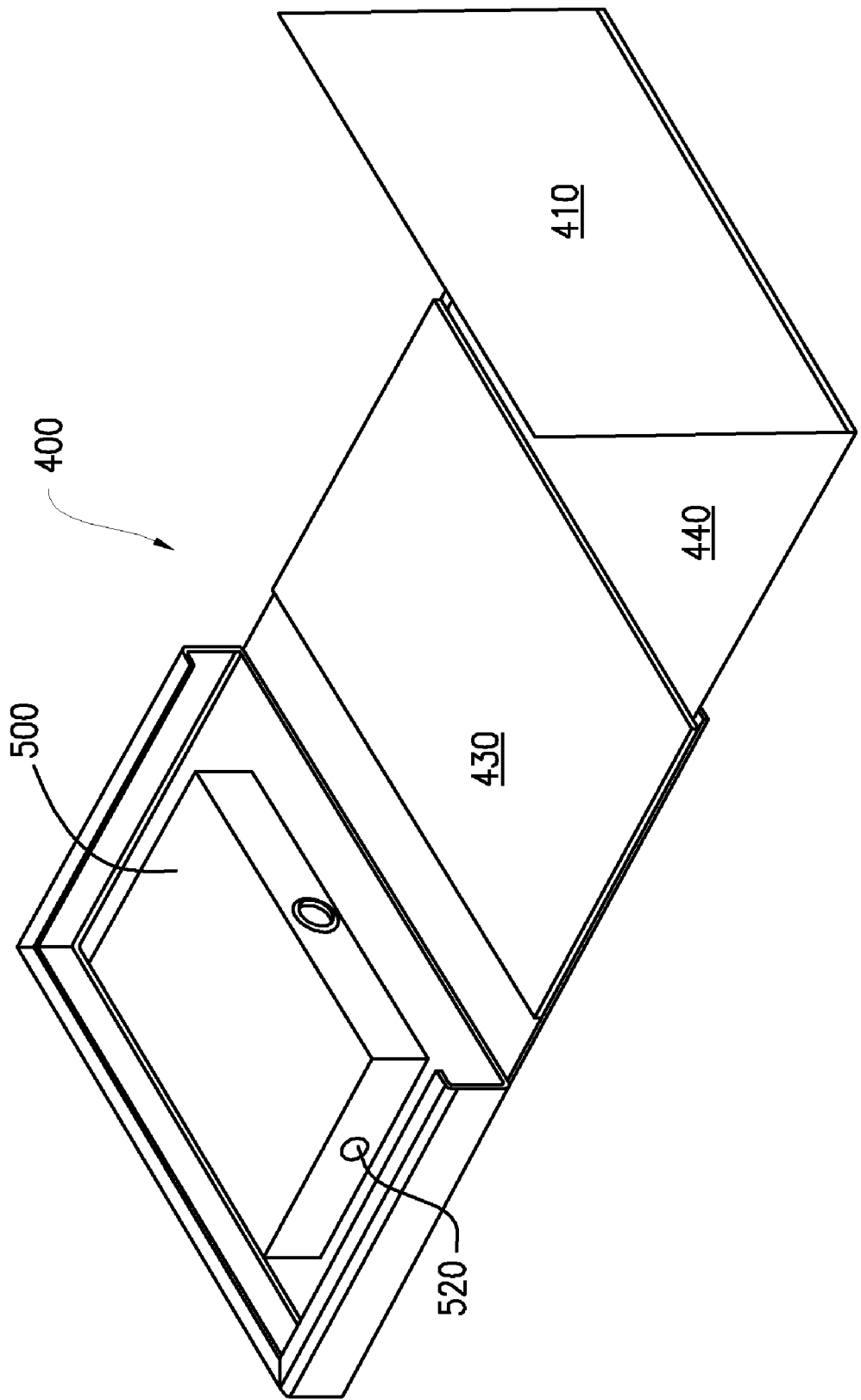
FIG. 4D is a perspective view of the projection kit of FIG. 4C in which the screen has been placed in a viewing position.
Figure 4E:
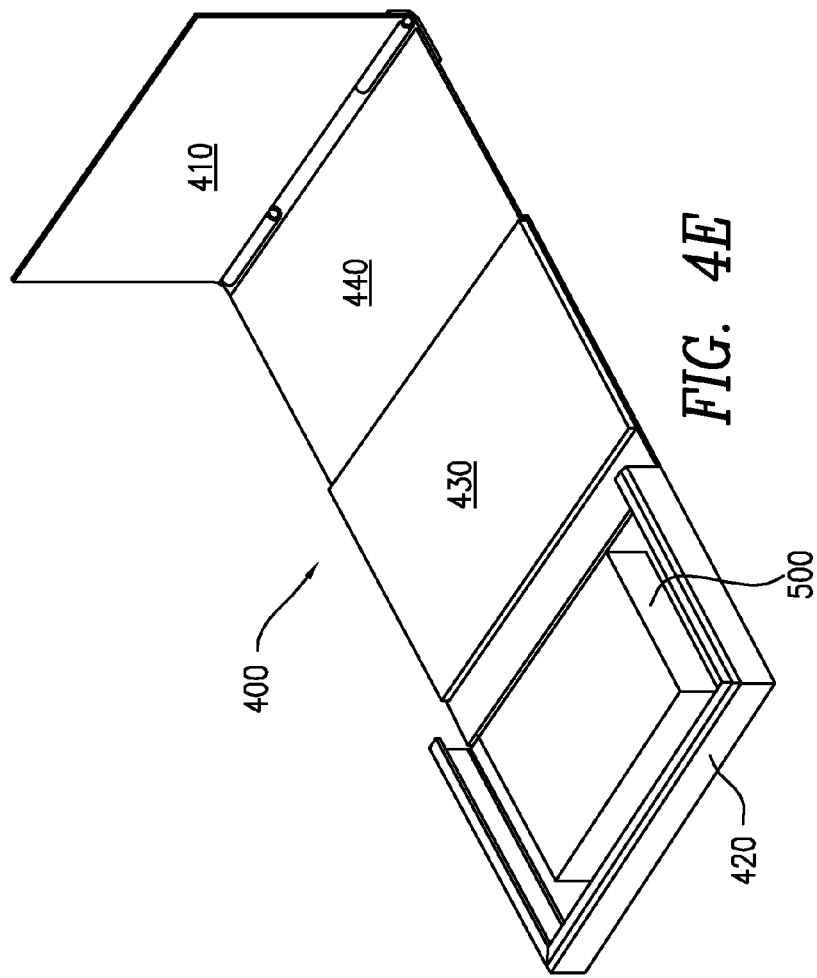
FIG. 4E is another perspective view of the projection kit with the screen in viewing position.

FIG. 4A shows projection kit 400 completely enclosed within enclosure 420. Starting from this state, the top of enclosure 420 may be opened and laid flat on a supporting surface, thereby revealing projector 500 disposed on an internal surface of enclosure (housing) 420. The top, or lid, of enclosure 420 may include panels 430 and 440. Thus, in proceeding further toward a projection configuration of projection kit 400, panel 440 may be pulled to separate it from panel 430 (FIGS. 4C-4E).

Thereafter, screen 410 may be lifted away from contact with panel 440 and moved so as to suitably orient the reflective surface of the screen 410 with respect to the aperture 510 of the projector 500. Screen 410 may be moved manually from an initial orientation parallel to panel 440. Alternatively, screen 410 could be spring loaded to move toward its projection orientation (projection position). The projection orientation of screen 410 is preferably such that the surface of screen 410 is at least substantially perpendicular to the direction of light projection from projector 500.

Figure 4F:
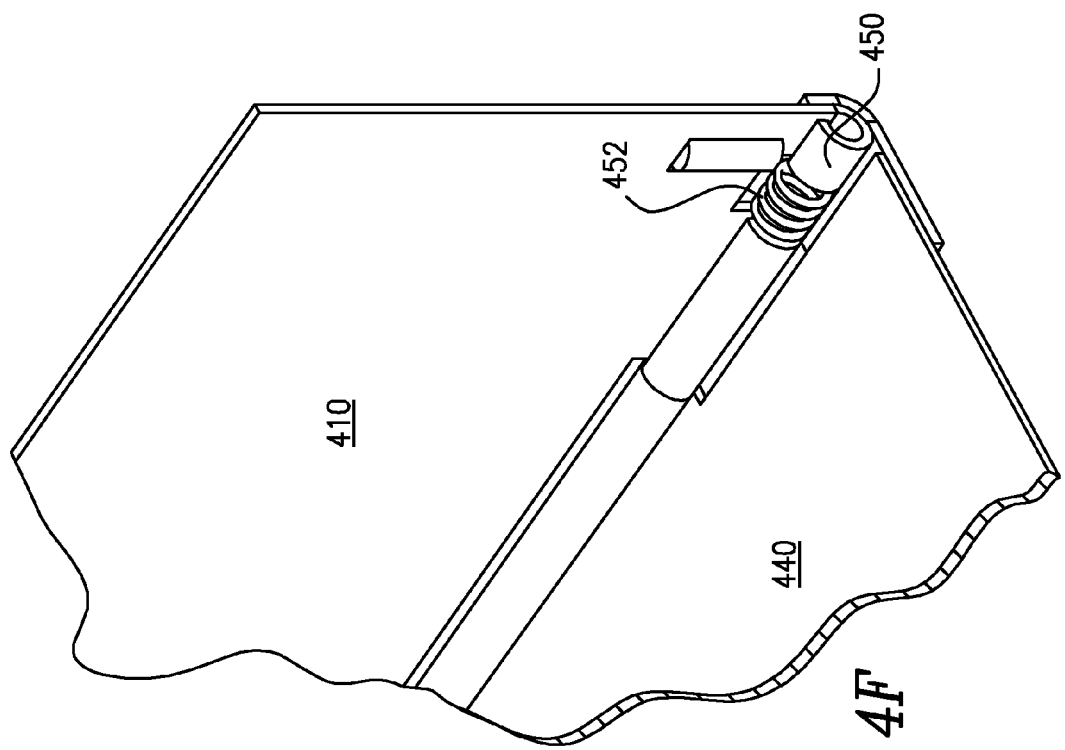
FIG. 4F is a perspective view of a mechanism for positioning the display screen of the projection kit of FIG. 4E.

With reference to FIG. 4F, projection kit 400 may include screen control mechanism 450 which may in turn include spring and latch assembly 452. In one embodiment, control mechanism 450 may be configured such that screen 410 may be manually rotated from an initial orientation parallel to panel 440 toward a projection orientation, in opposition to a spring force imparted by spring and latch assembly 452. Once the screen 410 reaches a projection orientation, spring and latch assembly 452 preferably operate to lock screen 410 in this position during the operation of projector 500.

In an alternative embodiment, the default spring-loading direction of spring and latch assembly 452 may be reversed. Specifically, spring and latch assembly 452 may impose a spring force that biases screen 410 toward the projection orientation, shown in FIGS. 4D-4F. In this embodiment, manual intervention may be employed to disengage any applicable locking mechanism within spring and latch assembly 452 and then force screen 410 into a "storage" orientation shown in FIG. 4C.

Consolidating the equipment of projection kit 400 within enclosure 400 may be accomplished by reversing the steps identified above. Specifically, screen 410 may be manually removed from its locked projection position and returned to a storage position as shown in FIG. 4C. The combination of panel 440 and screen 410 may then be moved over panel 430 to form the lid 460 for enclosure 420 (FIG. 4B). The lid 460 may then be placed over the top of enclosure 420 so as to completely enclose projector 500, screen 410, and the remainder of projection kit 400 within the interior of enclosure 420.

FIG. 4F shows a coil spring, rotatable about its longitudinal axis, that may form part of spring and latch assembly 452. However, in alternative embodiments, springs of different types and/or latches of various types, as are known to those of ordinary skill in the art, may be employed as part of spring and latch assembly 452.

Projector 500 may include means for reading video data from storage media incorporated within projector 500. Additionally or alternatively, projector 500 may include a video feed input 520 for receiving video input from an external device in communication with projector 500. While this invention contemplates presenting video data, other forms of data may be also be read by projector 500 and converted into a presentation format, including but not limited to audio data (suitable speakers may be provided), still image data, computer image data, and Internet browsing data (such as video, audio, text, still-image data, or other form of data).

Media storage types that may be used within projector 500 may include but are not limited to CD-ROMs, RAM (Random Access Memory) or ROM (Read Only Memory) cartridges, Flash memory, one or more computer storage disks, bubble memory, and/or any other suitable data storage format. When input 520 is employed to acquire data for presentation purposes, any suitable device may be employed as a source of the pertinent data, which may include but is not limited to video data, audio data, and/or still-image data. Devices used as video sources may include but are not limited to cell phones, PDAs, iPODs, or other suitable devices. Any suitable communication format may be employed to transmit data from an video data device, through input 520, into projector 520.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A display apparatus, comprising:
   a sheet of reflective material suitable for forming a display screen, the sheet having first and second edges along its length;
   an enclosure configured for storing the sheet of reflective material; and
   a screen control mechanism coupled to the enclosure and operable to move the reflective material into extended and refracted positions,
   wherein:
   the apparatus is portable and configured to receive image data from a hand-held projection device, and
   the enclosure and the screen control mechanism combine to form a stand enabling the display apparatus to be free-standing such that the display apparatus operates to be positioned independently from the hand-held projection device.

2. The apparatus of claim 1 further comprising: a stand operable to position the apparatus to enable light projection on the display screen.

3. The apparatus of claim 1 wherein the display screen has at least one of:
   a) a length less than or equal to about seven inches; and
   b) a width less than or equal to about five inches.

4. The apparatus of claim 1 further comprising an enclosure configured to house the reflective material, when the reflective material is not in use as a display screen.

5. The apparatus of claim 4 further comprising a spindle, disposed within the enclosure, about which to roll the reflective material.

6. The apparatus of claim 1 wherein the screen control mechanism comprises:
   an articulated arm connected to the enclosure and extending along the first edge of the sheet; and
   a post connected to the articulated arm and extending from the first edge of the sheet to the second edge of the sheet, the articulated arm and the post being operable to control the position of the sheet with respect to the enclosure.

7. The apparatus of claim 1 wherein the screen control mechanism comprises:
   an expanding grille linkage coupled to the reflective material and operable to move the reflective material between the refracted and extended positions thereof.

8. The apparatus of claim 1 wherein the screen control mechanism comprises:
   a ratchet mechanism coupled to the reflective material and operable to move the reflective material between the refracted and extended positions thereof.

9. An apparatus, comprising:
   a projector disposed on a first portion of a housing;
   a screen defining a panel connected to the first portion through at least one additional panel to which it is pivotally connected, the at least one additional panel being pivotally connected to the first portion, the screen being pivotable to overlie the at least one additional panel and, together therewith, to form a covering lid for an interior portion of the housing and the projector; and
   a screen adjustment mechanism enabling the screen to be adjusted so as to be positioned to receive free space light projection from the projector, while spaced from the first portion by the at least one additional panel.

10. The apparatus of claim 9 wherein
the screen adjustment mechanism is operable to form a sealed enclosure enclosing the projector and the screen therein, when the projector is not in use.

11. The apparatus of claim 9 wherein the screen adjustment mechanism is operable to orient the surface of the screen substantially perpendicular to a direction of light projection from the projector, wherein the substantially perpendicular orientation of the screen is a projection position.

12. The apparatus of claim 11 wherein the screen adjustment mechanism is operable to lock the screen in the projection position during operation of the projector.

13. The apparatus of claim 9 wherein the screen adjustment mechanism is operable to provide a stable footing for the apparatus during operation of the projector.

14. The apparatus of claim 9 wherein the projector comprises:
an input for receiving a data feed from an external device.

15. The apparatus of claim 14 wherein the input is operable to receive at least one of:
a) a video feed; and
b) an audio feed.

16. The apparatus of claim 9 wherein the screen includes a substantially rigid reflective sheet.

17. The apparatus of claim 9 wherein the screen is spring loaded and operating to be moved toward a projection orientation.

18. The apparatus of claim 9 wherein: (i) the screen operates to be moved away from the first portion of the housing when entering a projection orientation; and (ii) the screen operates to be moved toward the first portion of the housing when entering a storage position.

19. A display apparatus, comprising:
a sheet of reflective material suitable for forming a display screen, the sheet having first and second edges along its length;
an enclosure configured for storing the sheet of reflective material; and
a screen control mechanism coupled to the enclosure and operating to move the reflective material into extended and refracted positions, the screen control mechanism comprising: (i) an articulated arm connected to the enclosure and extending along the first edge of the sheet; and (ii) a post connected to the articulated arm and extending from the first edge of the sheet to the second edge of the sheet, the articulated arm and the post operating to control the position of the sheet with respect to the enclosure, wherein:
the enclosure and the screen control mechanism combine to form a stand enabling the display apparatus to be free-standing; and
the apparatus is portable and configured to receive image data from a hand-held projection device.

\* \* \* \* \*